United States Patent
Jung et al.

(10) Patent No.: US 8,713,587 B2
(45) Date of Patent: Apr. 29, 2014

(54) OPTICAL DISC DRIVE HAVING A TRAY FOR LOADING A DISC USING SUPPORTING PORTIONS

(75) Inventors: Young-sun Jung, Suwon-si (KR); Seong-yeon Park, Suwon-si (KR); Hyoung-woo Jo, Suwon-si (KR); Sung-ryool Yi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 267 days.

(21) Appl. No.: 12/619,872

(22) Filed: Nov. 17, 2009

(65) Prior Publication Data

US 2010/0125860 A1 May 20, 2010

(30) Foreign Application Priority Data

Nov. 19, 2008 (KR) ........................ 10-2008-0115330

(51) Int. Cl.
*G11B 17/03* (2006.01)
(52) U.S. Cl.
USPC ........................................................ 720/603
(58) Field of Classification Search
USPC .................................................. 720/601, 603
See application file for complete search history.

(56) References Cited

U.S. PATENT DOCUMENTS

| | | | | |
|---|---|---|---|---|
| 6,167,014 A * | 12/2000 | Kajiyama et al. | ............. | 720/616 |
| 6,959,443 B2 * | 10/2005 | Ohgaki | ......................... | 720/603 |
| 7,286,448 B2 * | 10/2007 | Suzuki et al. | .............. | 369/44.14 |
| 2005/0193398 A1 * | 9/2005 | Lee | ................................ | 720/603 |
| 2006/0044982 A1 * | 3/2006 | Guo et al. | .................. | 369/77.21 |
| 2006/0048168 A1 * | 3/2006 | Guo et al. | ..................... | 720/603 |
| 2006/0168598 A1 * | 7/2006 | Nishide et al. | ............... | 720/603 |
| 2007/0107005 A1 * | 5/2007 | Chen et al. | .................... | 720/671 |

FOREIGN PATENT DOCUMENTS

| | | |
|---|---|---|
| JP | 59-139186 | 8/1984 |
| JP | 63-213182 | 9/1988 |
| JP | 05-055342 | 3/1993 |
| JP | 09-017081 | 1/1997 |
| JP | 10-228698 | 8/1998 |
| JP | 11-031350 | 2/1999 |
| JP | 11-110870 | 4/1999 |
| JP | 2000-322797 | 11/2000 |
| JP | 2001-067754 | 3/2001 |
| JP | 2001-331992 | 11/2001 |
| JP | 2002-245702 | 8/2002 |
| JP | 2007149215 A * | 6/2007 |

OTHER PUBLICATIONS

Machine-Assisted Translation of JP 2007149215 A.*
Korean Office Action issued on Jan. 21, 2010, in corresponding Korean Application No. 10-2008-0115330 (4 pages).

* cited by examiner

*Primary Examiner* — Nathan Danielsen
(74) *Attorney, Agent, or Firm* — NSIP Law

(57) ABSTRACT

Provided is an optical disc drive having a tray to receive a disc. The tray includes a hollow portion having a bottom corresponding to the disc and a wall surrounding a portion of the bottom, and a plurality of supporting portions formed on the bottom of the hollow portion to locally support a bottom surface of the disc.

16 Claims, 9 Drawing Sheets

OPTICAL DISC DRIVE HAVING A TRAY FOR LOADING A DISC USING SUPPORTING PORTIONS

CROSS-REFERENCE TO RELATED PATENT APPLICATION(S)

This application claims priority the benefit under 35 U.S.C. §119(a) of a Korean Patent Application No. 10-2008-0115330, filed on Nov. 19, 2008, the entire disclosure of which is hereby incorporated by reference.

TECHNICAL FIELD

The following description relates to an optical disc drive, and more particularly, to an optical disc drive comprising a disc loading tray having an improved structure.

BACKGROUND

An optical disc drive may be used as an information recording and/or reproducing device in a computer. In an optical disc drive, a disc may be inserted with respect to the drive in a direction parallel to the ground or in a direction perpendicular to the ground. In addition to a disc magazine type, a disc may be inserted with respect to the drive using an open tray for loading the disc. When a disc is loaded in the direction parallel to the ground, the disc is placed on the tray and remains in place due to the weight of the disc. When the disc is loaded in the direction perpendicular to the ground, that is, in an upright state, the disc is prevented from escaping the tray by an additional supporting structure. The tray should maintain the disc with respect to a spindle, which rotates the disc, in a stable mounting state regardless of the direction in which the disc is oriented. In order to load the disc stably in the upright position, the disc supporting structure is further provided on the tray. The tray installed in the optical disc drive should properly support the disc even when the tray is deformed, and it is also desirable to easily manage the tolerances of the supporting structure when the tray is fabricated.

SUMMARY

According to one general aspect, there is provided an optical disc drive including a main body including a turntable to rotate a disc and an optical head to read and/or write with respect to the disc, and a tray to convey the disc into and out of the main body, wherein the tray includes a hollow portion having a bottom corresponding to the disc and a wall surrounding a portion of the bottom, and a plurality of supporting portions formed on the bottom of the hollow portion to locally support a bottom surface of the disc.

A surface of the wall surrounding the bottom may be formed along an arc of a circle which encircles the hollow portion.

The hollow portion may include at least one extended hollow portion, and the tray may further include one or more inclined supporting portions formed with respect to the extended hollow portion to support the disc entering the extended hollow portion.

The tray may further include a plurality of extended pieces to prevent the disc from escaping the tray, the plurality of extended pieces being disposed at predetermined intervals on an upper portion of the wall and formed to extend toward the hollow portion, and a diameter of a circular arc formed by end portions of the plurality of extended pieces, which face the hollow portion, may be equal to or greater than a diameter of the disc.

One of the plurality of extended pieces may be formed toward a front portion of the tray.

One of the plurality of supporting portions may be formed under the extended piece that is disposed toward the front portion of the tray.

A top surface of one or more of the plurality of supporting portions, to support the disc, may have a shape of a circle, a shape of an oval, a shape of a polygon, or provided as a curved surface.

Other features and aspects will be apparent from the following detailed description, the drawings, and the claims.

Figure 1:
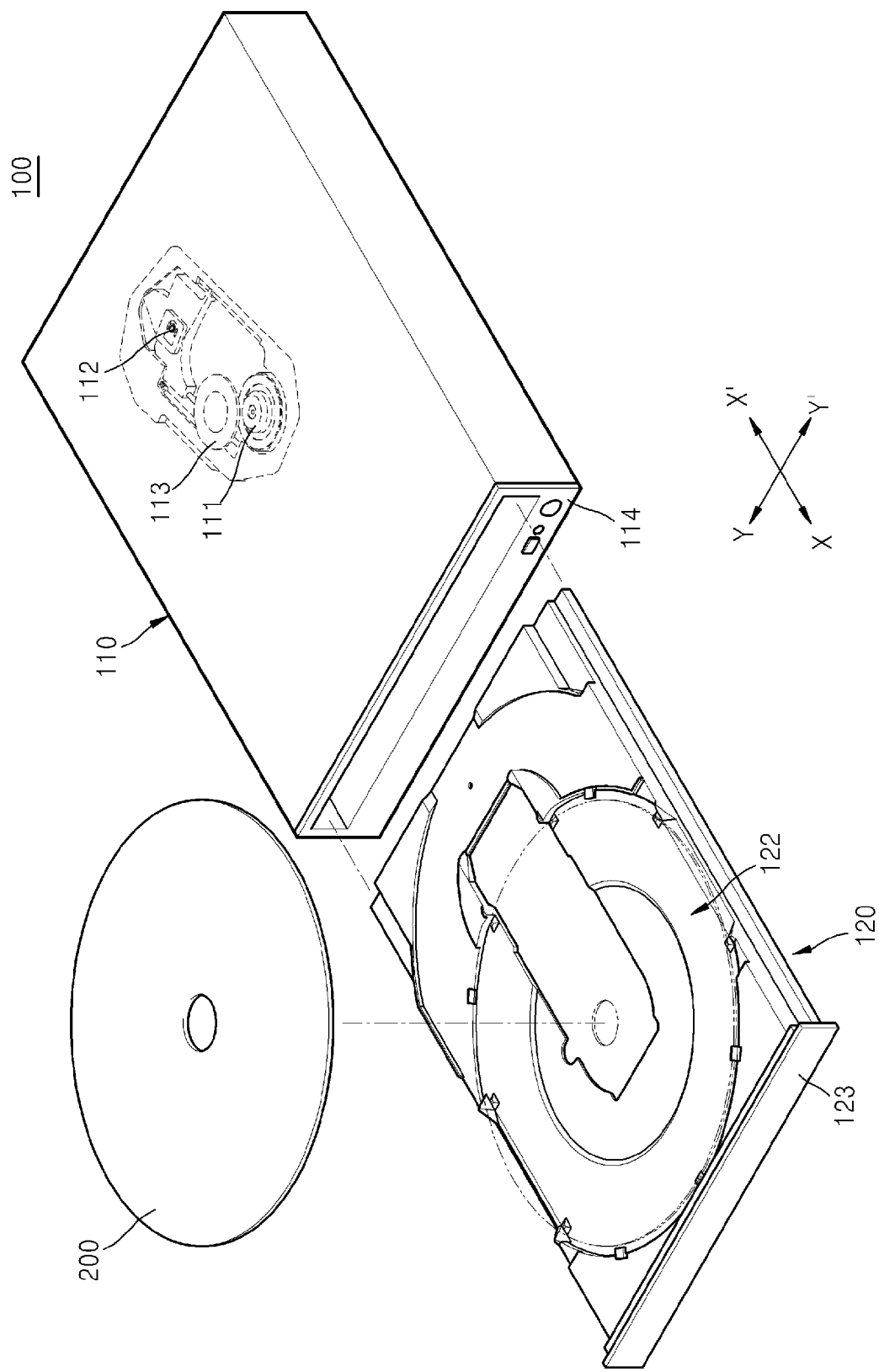
FIG. 1 is a diagram illustrating a perspective view of an exemplary optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is understood that when an element or layer is referred to as being "on", "disposed on", "disposed", or "between" another element or layer, it can be directly on, disposed on, disposed, or between the other element or layer, or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various exemplary embodiments.

Unless defined otherwise, technical and scientific terms used herein have the same meaning as is commonly understood by one of skill in the art to which following teachings belong.

FIG. 1 illustrates an exemplary optical disc drive 100. The optical disc drive 100 includes a main body 110 including a spindle 111, an optical head 112, associated devices (not shown), a circuit board (not shown), and a tray 120 used to convey a disc 200 that is to be loaded on the spindle 111 into/out of the main body 110. The tray 120 moves into/out of the main body 110 through a front panel 114 of the main body 110. The tray 120 receives the disc 200 on a hollow portion 122 in a loading position, and at this time, when the tray 120 enters the main body 110, the spindle 111 is ascended so that the disc 200 is lifted and separated from the hollow portion 122 of the tray 120. In addition, a clamper 113 located above the spindle 111 descends so that the disc 200 is located on the spindle 111. When the tray 120 is withdrawn, the spindle 111 descends so that the disc 200 lifted in the hollow portion 122 is placed on the hollow portion 122, and at the same time, the clamper 113, which fixes the disc 200 on the spindle 111, is separated from the disc 200 so that the disc 200 is freely placed on the hollow portion 122 of the tray 120. The disc loading/unloading processes are well known in the art, and further descriptions thereof will be omitted for conciseness. Hereinafter, a conveying direction (X-X') of the tray 120 may be referred to as a back and forth direction, and a side where a front panel 123 of the tray 120 is located may be referred to as a front portion or a front surface of the tray 120. In addition, a direction (Y-Y') crossing the conveying direction (X-X') of the tray at a right angle may be referred to as a left and right direction.

Figure 2:
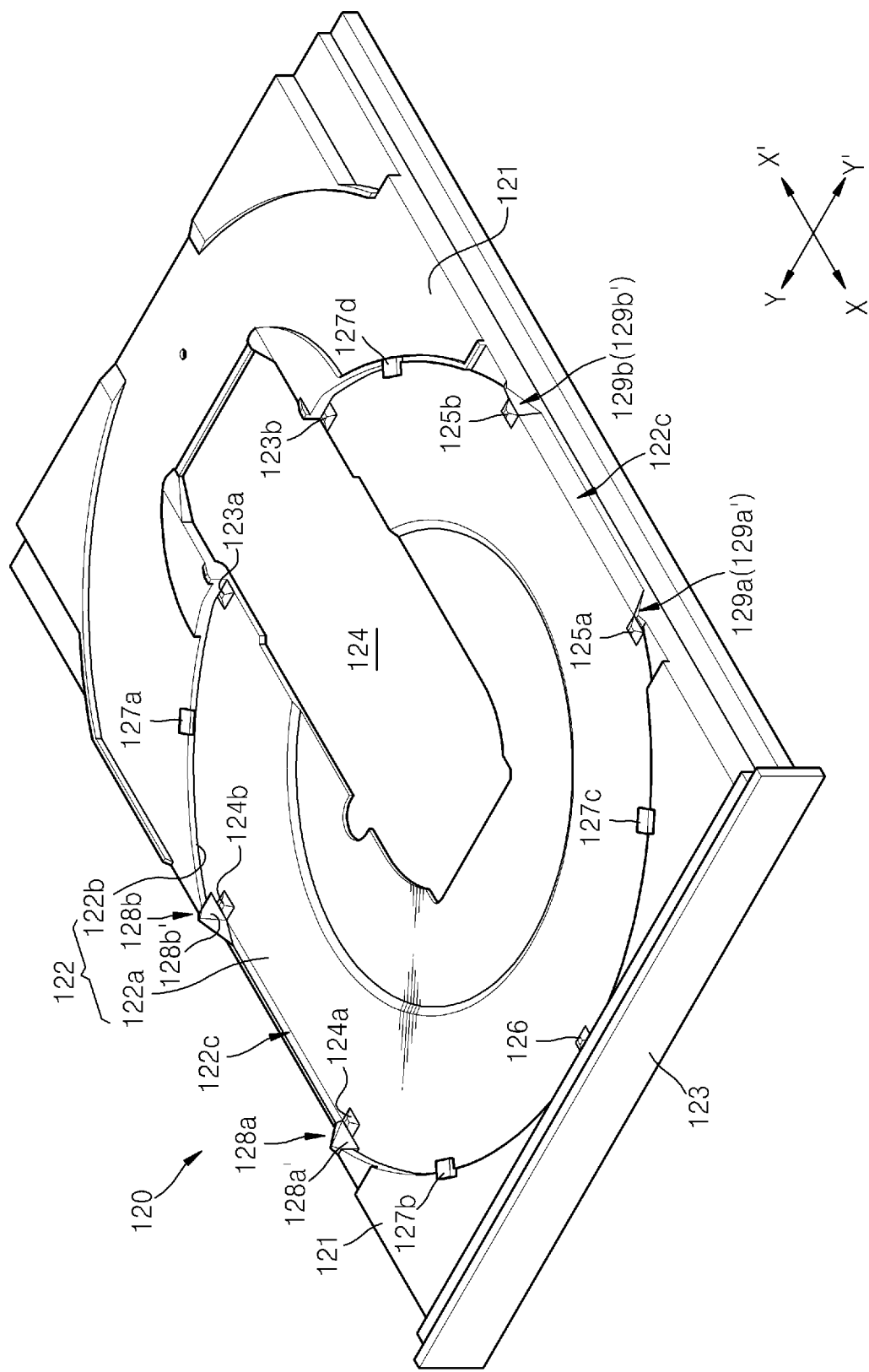
FIG. 2 is a diagram illustrating a perspective view of a tray included in the optical disc drive of FIG. 1.

FIG. 2 illustrates a perspective view of the exemplary tray 120 of the optical disc drive 100 of FIG. 1 in further detail. Referring to FIG. 2, the hollow portion 122 of the tray 120 is a disc receiving space formed towards on a center portion of a body 121 of the tray 120. The hollow portion 122 includes a bottom 122a, which has a predetermined depth lower than an upper surface of the body 121, and a wall 122b to surround the bottom 122a as shown. As shown in FIG. 2, an inner surface of the wall 122b that surrounds the bottom 122a may be formed as an arc of a circle that encircles the hollow portion 122.

Portions of the hollow portion 122, that is, left and right sides of the hollow portion 122 not having the wall 122b may be referred to as extended hollow portions 122c. Extended hollow portions 122c are portions where side portions of the disc 200 may be located, and where the tray 120 is in an upright state, an edge of the disc 200 may be provided onto one of the left and right extended hollow portions 122c.

Figure 7:
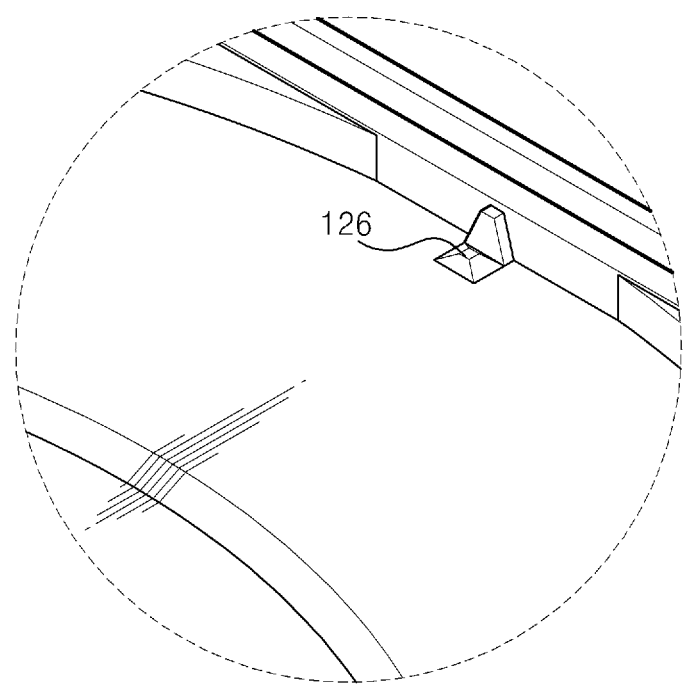
FIG. 7 is a diagram illustrating a partially expanded view showing a front of a hollow portion in the tray included in the optical disc drive of FIG. 1.
Figure 8:
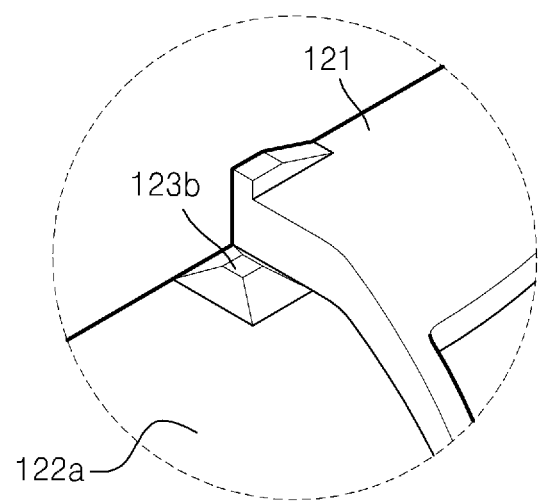
FIG. 8 is a diagram illustrating a partially expanded view showing a rear portion of the hollow portion in the tray included in the optical disc drive of FIG. 1.

Additionally, an island type supporting portions 123a, 123b, 124a, 124b, 125a, 125b, and 126, which protrude from the bottom 122a to a predetermined height, may be formed, for example, along the circumference of the hollow portion 122 with one or more of the supporting portions 123a, 123b, 124a, 124b, 125a, 125b, and 126 adjacent to the wall 122b. The supporting portions 123a, 123b, 124a, 124b, 125a, 125b, and 126 are formed at a height that is lower than that of the wall 122b, and support edge portions of the disc 200 by supporting the bottom of the disc 200. The supporting portions 123a, 123b, 124a, 124b, 125a, 125b, and 126 are formed at predetermined intervals towards the edge of the bottom 122a. As shown in FIG. 2, the supporting portions 123a and 123b are disposed relative to opposite sides of a head moving region 124. Referring to FIG. 8, the supporting portion 123b formed on the bottom 122a may be located near a side of the head moving region 124, and while not shown in FIG. 8, the supporting portion 123a formed on the bottom 122a may be located near another side of the head moving region 124. Referring back to FIG. 2, the supporting portions 124a and 124b, and 125a and 125b are disposed to face opposite portions of the extended hollow portions 122c, respectively. The supporting portion 126 is disposed towards the front surface of the tray 120, and FIG. 7 shows the front supporting portion 126 in further detail. The supporting portions 123a, 123b, 124a, 124b, 125a, 125b, and 126 may have top surfaces shaped as a polygon, for example, a square or a rectangle, and may distribute local contact pressure by allowing the surface of the disc 200 and the supporting portions 123a, 123b, 124a, 124b, 125a, 125b, and 126 to contact each other while minimizing the contact area.

Figure 6:
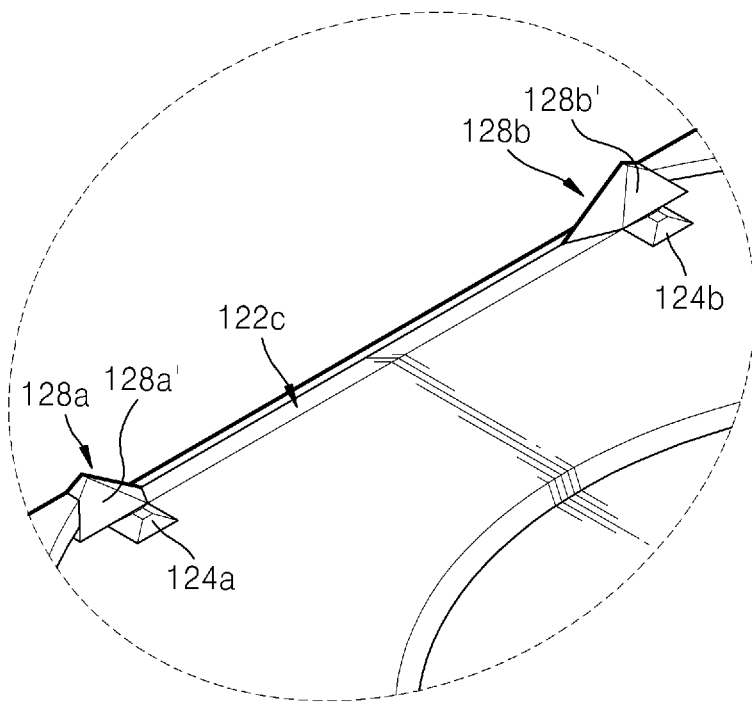
FIG. 6 is a diagram illustrating a partially expanded view of an extended hollow portion in the tray included in the optical disc drive of FIG. 1.

In addition, inclined supporting portions 128a, 128b, 129a, and 129b may be formed adjacent to the supporting portions 124a, 124b, 125a, and 125b, respectively, also facing the opposite portions of the extended hollow portions 122c. The inclined supporting portions 128a, 128b, 129a, and 129b are provided to have a higher height than the supporting portions 123a, 123b, 124a, 124b, 125a, 125b, and 126. For example, as shown in FIG. 6, the inclined supporting portions 128a and 128b may be formed on a portion of the extended hollow portion 122c, and the inclined supporting portions 128a and 128b may include inclined portions 128a' and 128b', respectively, that correspond to the edge of the disc 200. The inclined supporting portions 129a and 129b located on a portion of another extended hollow portion 122c may also include inclined portions 129a' and 129b', respectively, corresponding to the edge of the disc 200.

The inclined portions 128a' and 129a' may be formed to be symmetric to each other with respect to the hollow portion 122 of the tray 120. In addition, the inclined portions 128b' and 129b' may be symmetric to each other with respect to the hollow portion 122 of the tray 120. When the tray 120 is in the upright state, some of the inclined portions 128a', 128b', 129a', and 129b' may contact the edge of the disc 200 (see FIG. 1) due to the disc being eccentric from the center of the hollow portion 122. When the tray 120 is positioned substantially parallel to the X-X' or Y-Y' direction, the inclined portions 128a', 128b', 129a', and 129b' may position the disc 200 to center the disc 200 with respect to the hollow portion 122 when the disc 200 is slanted in the hollow portion 122. The height of the inclined supporting portions 128a, 128b, 129a, and 129b may vary depending on the thickness of the disc 200.

Extended pieces 127a, 127b, 127c, and 127d, which prevent the disc 200 from escaping the tray 120, may be formed on an upper portion of the wall 122b. The extended pieces 127a, 127b, 127c, and 127d prevent the disc 200 from escaping the hollow portion 122 of the tray 120. For example, when the tray 120 is in the upright position, the edge of the disc 200 may be hung on some of the extended pieces 127a, 127b, 127c, and 127d.

Figure 3:
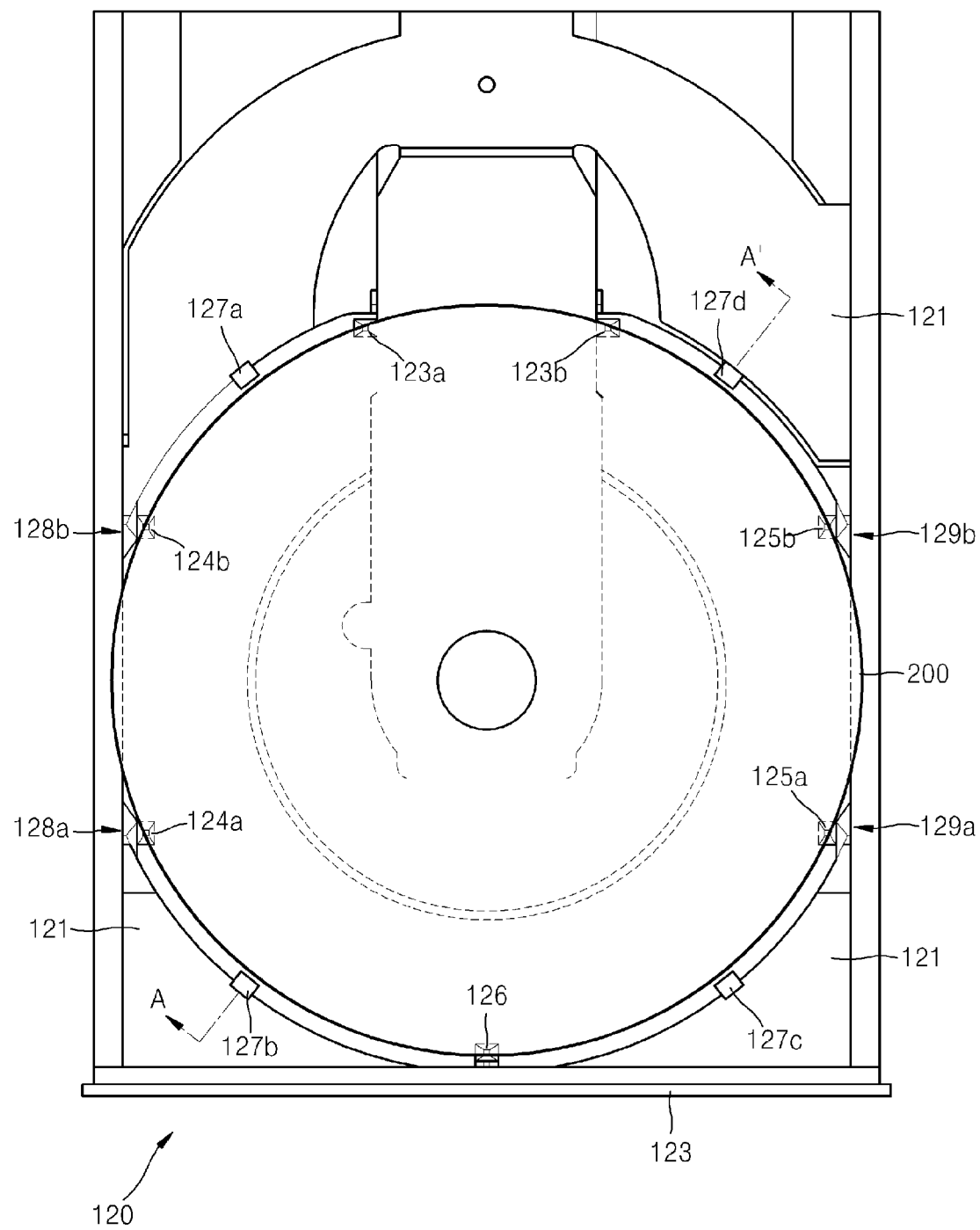
FIG. 3 is a diagram illustrating a plan view of the tray included in the optical disc drive of FIG. 1.

FIG. 3 illustrates a plan view of the tray 120 showing relative positions between the disc 200 and the supporting portions 123a, 123b, 124a, 124b, 125a, 125b, and 126. As shown in FIG. 3, the supporting portions 123a, 123b, 124a, 124b, 125a, 125b, and 126 are located in the hollow portion 122, near the edge of the disc 200, and accordingly, the disc 200 is suspended from the bottom 122a at a predetermined height. Additionally, the extended pieces 127a, 127b, 127c, and 127d are formed along circular arcs of the wall 122b and on an upper portion of the wall 122b, that is, on the upper surface of the body 121 of the tray 120. Two extended pieces 127a and 127b are formed on the left side of the tray 120 and the extended pieces 127c and 127d are formed on the right side of the tray 120.

End portions, which face the hollow portion 122, of the extended pieces 127a, 127b, 127c, and 127d may form a circular arc, a minimum diameter of which may be equal to that of the disc 200 or greater. The supporting portions 124a and 124b, and 125a and 125b and the inclined supporting portions 128a and 128b, and 129a and 129b are disposed near or on the extended hollow portions 122c, as shown. The supporting portions 123a, 123b, 124a, 124b, 125a, 125b, and 126 and the inclined supporting portions 128a, 128b, 129a, and 129b disposed on the tray 120 prevent the disc 200 from escaping the hollow portion 122 when the tray 120 is in the upright position.

Figure 4:
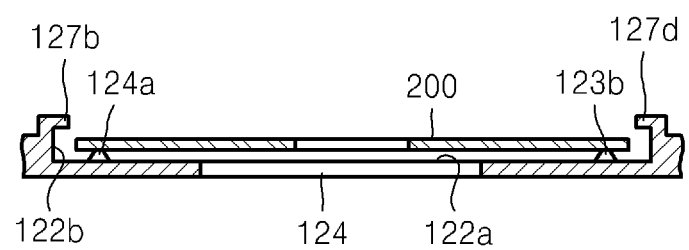
FIG. 4 is a diagram illustrating a cross-sectional view of the tray of FIG. 3 taken along a line A-A'.

FIG. 4 illustrates a cross-sectional view of the tray 120 taken along the line A-A' of FIG. 3, and shows the relations of the extended pieces 127b and 127d and the supporting portions 123b and 124a with respect to the disc 200 located in the hollow portion 122. As shown in FIG. 4, the disc 200 is supported by the supporting portions 124a and 123b in the hollow portion 122, which is surrounded by the wall 122b.

Figure 5:
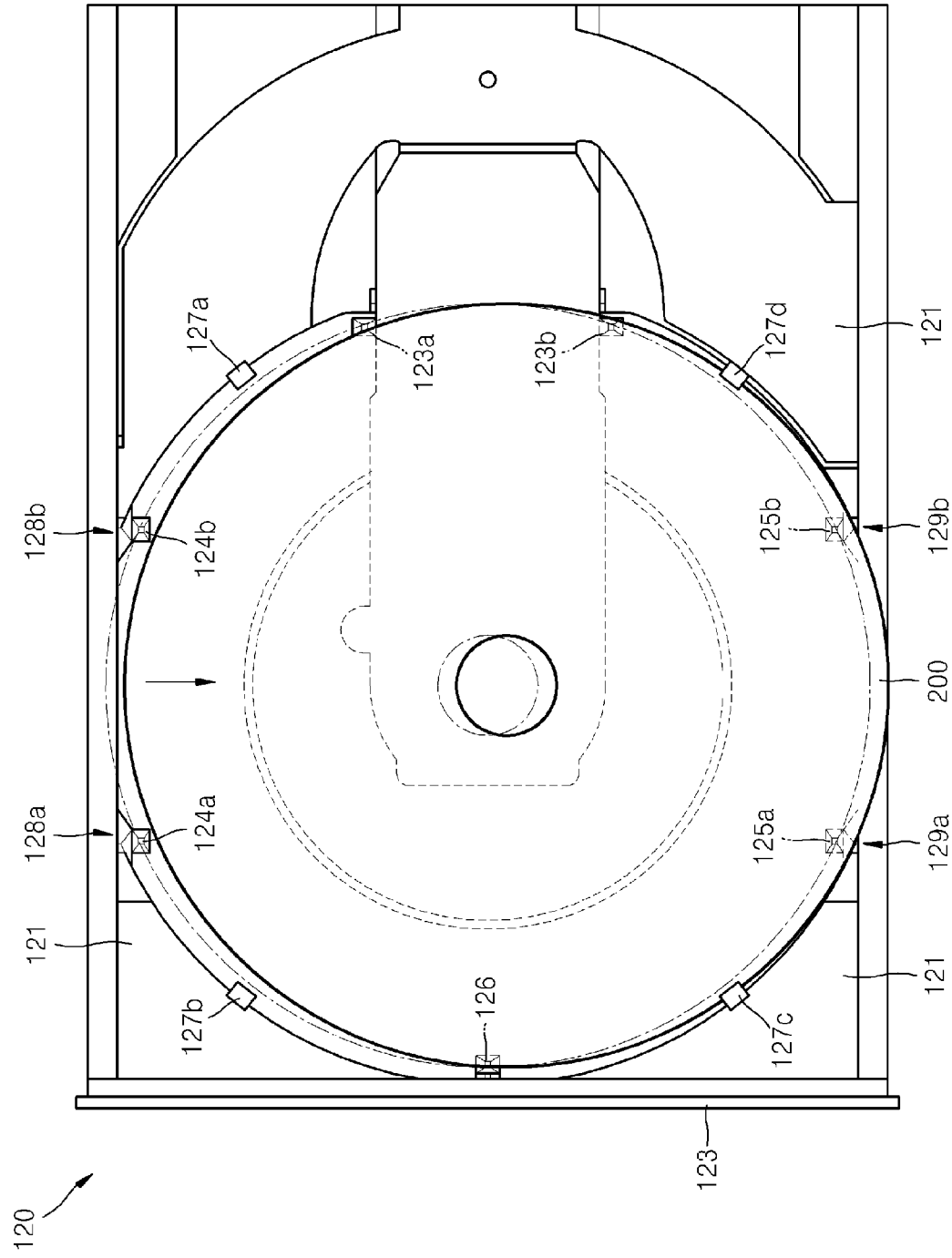
FIG. 5 is a diagram illustrating a plan view of the tray included in the optical disc drive of FIG. 1 when the optical disc drive and a disc are in an upright state.

FIG. 5 illustrates a state in which the disc 200 is eccentric downward due to gravity when the tray 120 is in the upright position. As shown in FIG. 5, the disc 200 faces the ground and enters into one of the extended hollow portion 122c. Some portions of the disc 200 contact the wall 122b and other portions of the disc 200 are placed on the extended pieces 127c and 127d. Therefore, the disc 200 is supported by the extended pieces 127c and 127d, and the bottom at the edge of the disc 200 contacts the bottom of the extended hollow portion 122c or the top of the inclined supporting portions 129a and 129b. Therefore, the disc 200 is prevented from escaping the tray 120 even when the tray 120 is in the upright position.

Figure 9:
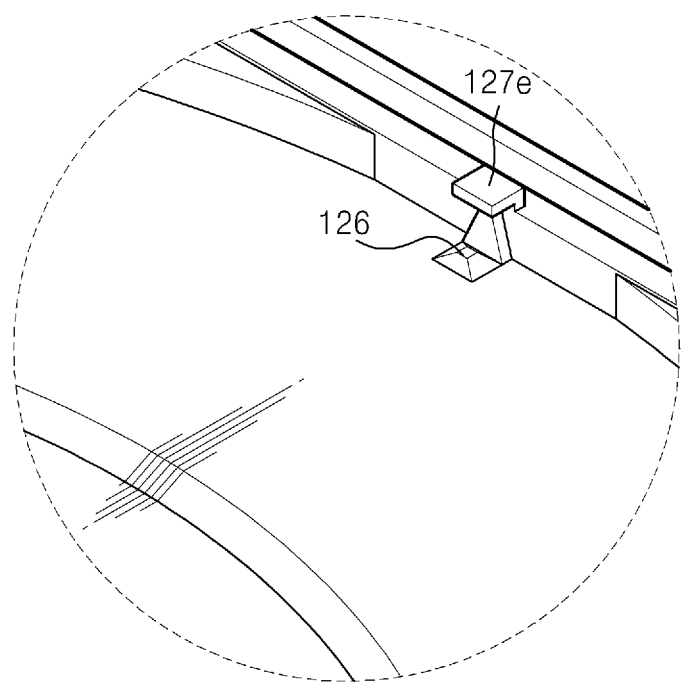
FIG. 9 is a diagram illustrating a partially expanded view showing a front of a hollow portion in a tray included in another exemplary optical disc drive.
Figure 10:
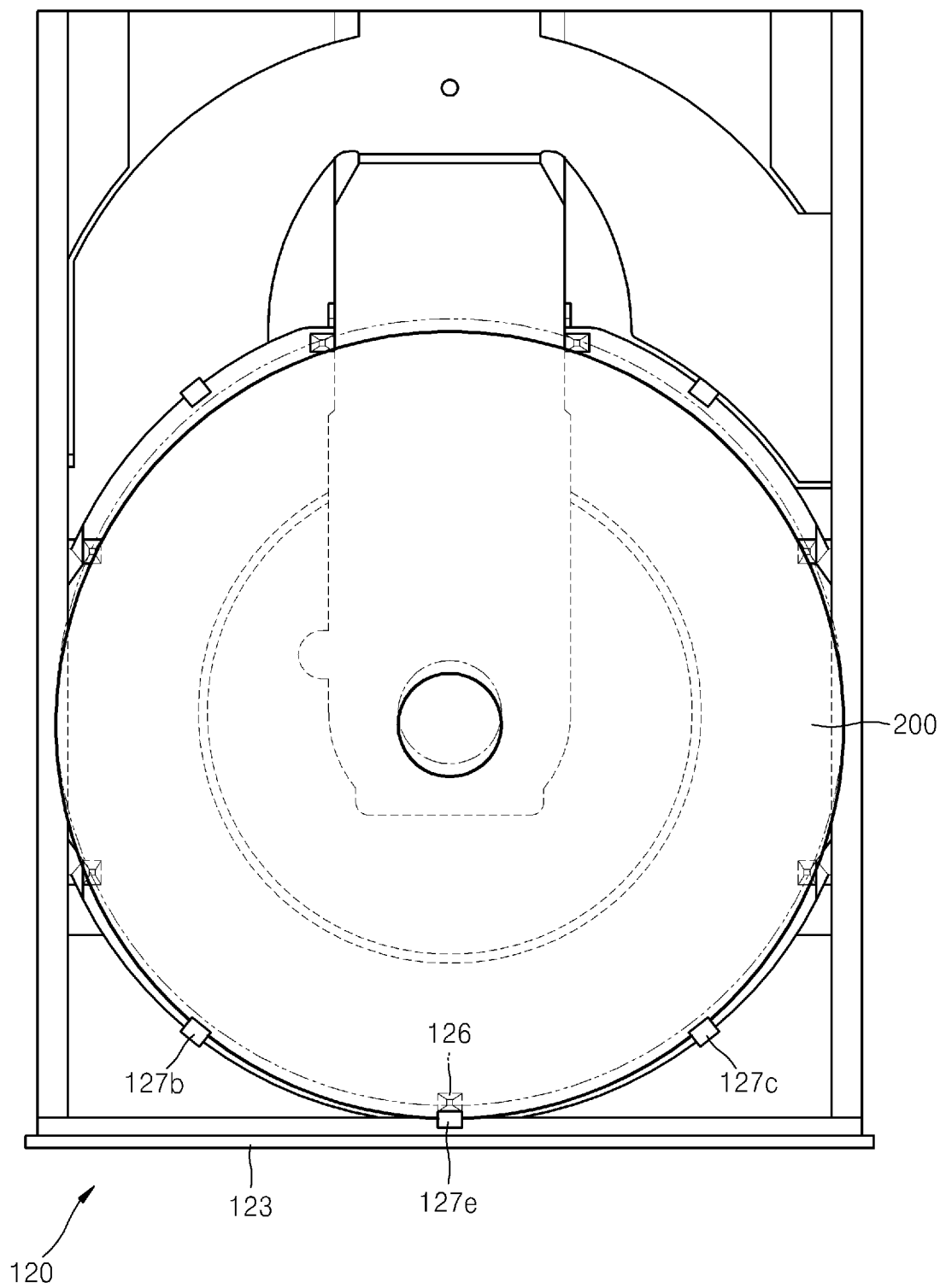
FIG. 10 is a diagram illustrating the tray included in the optical disc drive of FIG. 1, holding a disc, when a front surface of the tray faces the ground.

FIG. 9 illustrates the supporting portion 126 on a front portion of another exemplary tray further having an extended piece 127e. As shown in FIG. 9, the extended piece 127e may be formed above the supporting portion 126 to prevent the disc 200 from escaping the tray. For example, when the front panel 123 faces downward as shown in FIG. 10, that is, when the front panel 123 faces the ground, the extended piece 127e, along with the extended pieces 127b and 127c, prevent the disc 200 from escaping the tray.

Figure 11A:
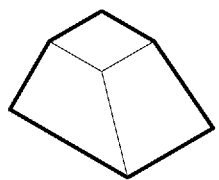
FIGS. 11A through 11C are diagrams illustrating various examples or modifications of a disc supporting portion in a tray.
Figure 11B:
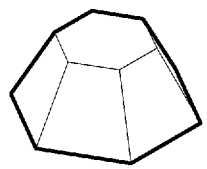
Figure 11C:

FIGS. 11A to 11C illustrates various exemplary shapes for a supporting portion, that is, the supporting portions 123a, 123b, 124a, 124b, 125a, 125b, and 126 of FIG. 2.

FIG. 11A illustrates a supporting portion having a top surface formed as a square. FIG. 11B illustrates a supporting portion having a top surface formed as a hexagon. FIG. 11C illustrates a supporting portion having a top surface formed as a curved surface.

According to the teachings above or certain example(s) described above, a contact area between a bottom surface of a disc and a supporting portion of a tray may be reduced. Accordingly, damages to the bottom surface of the disc may be prevented. In addition, a tray may be provided that properly supports a disc even when the tray is deformed, for example, due to aging. That is, when a tray having a large contact area between a disc and a supporting portion is deformed, the disc may be locally separated from the supporting portion. However, when a tray is provided to support a disc while having a contact area between the disc and a supporting portion(s) reduced, the lifting of the disc from the supporting portion(s) may be prevented. Furthermore, a tray may be fabricated in which the tolerances for the tray may be more easily controlled.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive comprising:
   a main body including a turntable to rotate a disc and an optical head to read or write with respect to the disc; and
   a tray to convey the disc into and out of the main body, the tray comprising:
      a hollow portion comprising a bottom corresponding to the disc;
      a wall surrounding the bottom;
      two extended hollow regions disposed on opposing sides of the tray;
      a plurality of supporting portions formed on the bottom of the hollow portion to locally support a bottom surface of the disc; and
      at least four inclined supporting portions, each having a height greater than a height of the wall, to support the disc entering the extended hollow regions,
   wherein each extended hollow region comprises one of the at least four inclined supporting portions disposed on opposing ends thereof; and
   supporting portions are disposed adjacent to the at least four inclined supporting portions.

2. The optical disc drive of claim 1, wherein a surface of the wall surrounding the bottom is formed along an arc of a circle which encircles the hollow portion.

3. The optical disc drive of claim 2, wherein:
   the tray further includes a plurality of extended pieces to prevent the disc from escaping the tray, the plurality of extended pieces being disposed at predetermined intervals on an upper portion of the wall and formed to extend toward the hollow portion, and a diameter of a circular arc formed by end portions of the plurality of extended pieces, which face the hollow portion, is equal to or greater than a diameter of the disc.

4. The optical disc drive of claim 3, wherein one of the plurality of extended pieces is formed toward a front portion of the tray.

5. The optical disc drive of claim 4, wherein one of the plurality of supporting portions is formed under the extended piece that is disposed toward the front portion of the tray.

6. The optical disc drive of claim 2, wherein a top surface of one or more of the plurality of supporting portions, to support the disc, has a shape of a circle, a shape of an oval, a shape of a polygon, or is provided as a curved surface.

7. The optical disc drive of claim 1, wherein:
the tray further includes a plurality of extended pieces to prevent the disc from escaping the tray, the plurality of extended pieces being disposed at predetermined intervals on an upper portion of the wall and formed to extend toward the hollow portion, and
a diameter of a circular arc formed by end portions of the plurality of extended pieces, which face the hollow portion, is equal to or greater than a diameter of the disc.

8. The optical disc drive of claim 7, wherein one of the plurality of extended pieces is formed toward a front portion of the tray.

9. The optical disc drive of claim 8, wherein one of the plurality of supporting portions is formed under the extended piece that is disposed toward the front portion of the tray.

10. The optical disc drive of claim 1, wherein a top surface of one or more of the plurality of supporting portions, to support the disc, has a shape of a circle, a shape of an oval, a shape of a polygon, or is provided as a curved surface.

11. The optical disc drive of claim 1, wherein each respective supporting portion comprises a contact surface that contacts the bottom surface of the disc, and the contact surface has a diameter that is less than a diameter of a base of the respective supporting portion.

12. The optical disc drive of claim 1, wherein each of the at least four inclined supporting portions comprise two inclined supporting surfaces.

13. The optical disc drive of claim 1, wherein each of the at least four inclined supporting portions comprise a supporting surface facing an axis that is parallel to movement of the tray into and out of the main body.

14. The optical disc drive of claim 1, wherein the plurality of supporting portions are disposed adjacent to the wall without directly contacting the wall.

15. An optical disc drive comprising:
a main body including a turntable to rotate a disc and an optical head to read or write with respect to the disc; and
a tray to convey the disc into and out of the main body, the tray comprising:
a hollow portion comprising a bottom corresponding to the disc;
a wall surrounding the bottom;
two extended hollow regions disposed on opposing sides of the tray;
a plurality of supporting portions formed on the bottom of the hollow portion to locally support a bottom surface of the disc; and
at least four inclined supporting portions, each comprising two inclined supporting surfaces, to support the disc entering the extended hollow regions,
wherein each extended hollow region comprises one of the at least four inclined supporting portions disposed on opposing ends thereof; and
supporting portions are directly disposed on the tray in positions which are directly adjacent to the at least four inclined supporting portions and directly adjacent to the wall without contacting the wall.

16. An optical disc drive comprising:
a main body including a turntable to rotate a disc and an optical head to read or write with respect to the disc; and
a tray to convey the disc into and out of the main body, the tray comprising:
a hollow portion comprising a bottom corresponding to the disc;
a wall surrounding the bottom;
two extended hollow regions disposed on opposing sides of the tray;
at least three supporting portions formed on the bottom of the hollow portion to locally support a bottom surface of the disc; and
at least four inclined supporting portions, each comprising a supporting surface facing an axis that is parallel to movement of the tray into and out of the main body, to support the disc entering the extended hollow regions,
wherein each extended hollow region comprises one of the at least four inclined supporting portions disposed on opposing ends thereof; and
the at least three supporting portions are disposed directly adjacent to the wall in a first position which is central to a front end of the tray, a second position which is on a left side of a head moving region, and a third position which is on a right side of the head moving region.

* * * * *